US008109689B2

(12) United States Patent
Kronenberg et al.

(10) Patent No.: US 8,109,689 B2
(45) Date of Patent: Feb. 7, 2012

(54) PLUG-IN CONNECTOR

(76) Inventors: Ralf M. Kronenberg, Haan/Rhld. (DE); Max Kronenberg, Solingen (DE)

( * ) Notice: Subject to any disclaimer, the term of this patent is extended or adjusted under 35 U.S.C. 154(b) by 576 days.

(21) Appl. No.: 12/295,789

(22) PCT Filed: May 18, 2007

(86) PCT No.: PCT/EP2007/004449

§ 371 (c)(1),
(2), (4) Date: Oct. 2, 2008

(87) PCT Pub. No.: WO2008/006417

PCT Pub. Date: Jan. 17, 2008

(65) Prior Publication Data

US 2009/0049774 A1 Feb. 26, 2009

(30) Foreign Application Priority Data

Jun. 14, 2006 (DE) ..................... 20 2006 009 491 U

(51) Int. Cl.

*F16B 39/22* (2006.01)
*E06B 3/68* (2006.01)
*E06B 3/66* (2006.01)

(52) U.S. Cl. ........ 403/298; 403/297; 403/309; 403/331; 403/294; 411/458; 411/339; 52/656.9; 52/656.6; 52/656.5; 52/456

(58) Field of Classification Search ................. 52/204.5, 52/204.593, 204.595, 204.6, 220.1, 220.8, 52/656.9, 656.6, 656.5, 656.2, 456, 665, 52/314, 664; 411/508–510, 339, 913, 477–479, 411/458, 385; 439/660, 639, 59, 79; 403/292, 403/295, 297–298, 309, 314, 405.1, 409.1, 403/280, 402–403, 288, 267, 375, 331, 231, 403/300–302, 294, 286, 408.1; 446/120–121
See application file for complete search history.

(56) References Cited

U.S. PATENT DOCUMENTS

| | | | | |
|---|---|---|---|---|
| 5,209,599 | A * | 5/1993 | Kronenberg | 403/298 |
| 5,560,731 | A * | 10/1996 | Kronenberg | 403/298 |
| 6,431,784 | B1 * | 8/2002 | Kronenberg | 403/297 |
| 6,764,247 | B1 * | 7/2004 | Kronenberg | 403/292 |
| 6,826,859 | B1 * | 12/2004 | Lin | 40/514 |
| 7,070,356 | B2 * | 7/2006 | Kronenberg et al. | 403/297 |

FOREIGN PATENT DOCUMENTS

| | | |
|---|---|---|
| DE | 92 09 382.5 | 7/1993 |
| DE | 299 09 413 | 11/2000 |
| DE | 203 04 330 | 9/2004 |
| DE | 20 2004 004 93 | 8/2005 |
| DE | 202004004734 | 10/2005 |
| EP | 0 283 689 | 9/1988 |

* cited by examiner

*Primary Examiner* — Jeanette E. Chapman
(74) *Attorney, Agent, or Firm* — McGlew and Tuttle, P.C.

(57) ABSTRACT

The invention relates to a plug connector (1) for hollow profiles (4) in spacer frames for insulated glass panes. The plug connector (1) comprises at least two connector parts (2, 3) which may be plugged together and which have an essentially U-shaped or rectangular cross-section, which, in the plugged position, have adjacent side walls (6,17) and a positive fit (9). One connector part (2) has at least one retainer element (12) on the side walls (6) thereof (12) with a corresponding wall opening (13). In order to form the positive connection (9), the other connector part (3) has a projection (10) with a positive fit engagement in the wall opening (13) of the retainer element (12) when in the plugged position.

19 Claims, 4 Drawing Sheets

Fig. 5
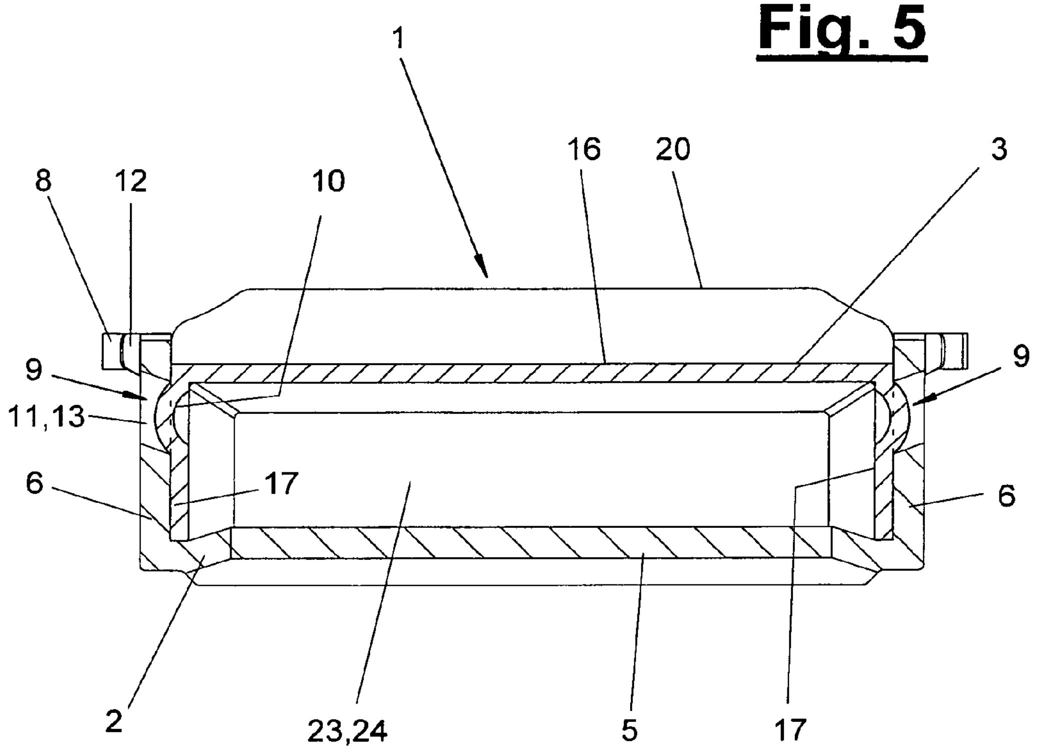
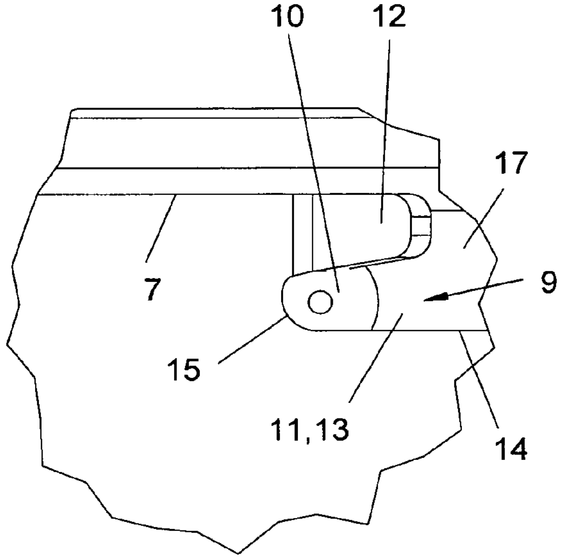
Fig. 6

PLUG-IN CONNECTOR

CROSS REFERENCE TO RELATED APPLICATIONS

This application is a United States National Phase application of International Application PCT/EP2007/0074449 and claims the benefit of priority under 35 U.S.C. §119 of German Patent Application DE 20 2006 009 491.1 filed Jun. 14, 2006, the entire contents of which are incorporated herein by reference.

FIELD OF THE INVENTION

The present invention pertains to a plug-in connector Plug-in connector for hollow sections (4) of spacer frames for insulating glass panes, wherein the plug-in connector (1) comprises at least two connector parts (2, 3) that can be plugged into each other with an essentially U-shaped or box-shaped cross section, which have adjacent side walls

BACKGROUND OF THE INVENTION

A multipart plug-in connector is known from DE 20 2004 004 734 U1. It comprises two connector parts, which can be plugged into one another, with an essentially U-shaped or box-shaped cross section. In the plugged-in position, the side walls of the two shell-shaped connector parts are located adjacent to each other and have a positive-locking connection to secure the holding together of the two connector parts. The positive-locking connection or clip connection comprises a plurality of projections on the inner connector part and corresponding receiving openings on the outer connector part. The receiving openings are created specifically for the projections and are located in the vicinity of the transversely extending center line in the solid side wall area. The outer connector part has a plurality of spring boss-like retaining elements at the side walls, which are arranged at spaced locations from the center line and the receiving openings.

DE 299 09 413 U1 shows a variant of a two-part plug-in connector, in which the two connector parts plugged one into the other are held by clamping connection.

A one-part plug-in connector, which has a U-shaped cross section and has a plurality of cut-out and projecting retaining dogs, is known from EP 0 283 689 A1.

SUMMARY OF THE INVENTION

The object of the present invention is to provide a further improved plug-in connector.

The multipart plug-in connector according to the invention has the advantage that due to the use of wall openings in the area of retaining elements, which openings act as receiving openings for positive-locking connection of the two connector parts, the design effort and costs can be reduced. The wall openings may belong to the retaining elements and are present anyway. Standard plugs, which are designed, e.g., corresponding to EP 0 283 689 A1 and can also be used as individual plugs and which are present in correspondingly large numbers, may be used as the outer connector part. As a result, the standard connector will have an expanded range of use and application. The standard connector does not need to be converted for this multiple use.

The customer may make the decision on whether to work with a one-part or multipart plug-in connector as needed. The customer needs to stock only one type of connector parts, e.g., the inner connector parts in a number appropriate for his needs. The outer connector parts are present as standard plugs anyway. This lowers the efforts needed for stocking and the costs.

The use of wall openings on the retaining elements as receiving openings for the positive-locking connection has further advantages. Shapes of the outer connector parts, which are present anyway, can be used, so that the manufacturing effort is reduced. Furthermore, the two connector parts can be plugged into one another more easily. This is especially true when the wall opening is arranged close to and, e.g., below a retaining element, which is designed in the form of a spring boss and which yields more easily when the connector parts are being plugged into one another and escapes in a springy manner. The meshing of the projection with a wall opening located below the retaining element has, furthermore, the advantage that the spring property and the spring excursion of the retaining element are not compromised, and good positive-locking connection is nevertheless brought about, which ensures the reliable holding together of the connector parts in the plugged-in position. When the hollow sections are plugged in, these press the retaining elements somewhat back, as a result of which the clip connection can be additionally stabilized.

The two-part plug-in connector makes possible a tubular connector shape, which is closed circumferentially at the junction site of the spacer hollow sections and offers a high level of safety against the discharge of a granulated desiccant present in the spacer frame. In addition, a gas-tight connection can be created by introducing a sealant, e.g., butyl, rubber. The inner and/or outer connector part may optionally have for this, in the middle area, a depression, into which a sealant can be later introduced in a suitable form during the mounting in the spacer frame. A sealant may alternatively already have been arranged as a support at the plug-in connector from the front. The plug-in connector may have open front sides, which makes it possible for the desiccant to flow through and to accumulate at the junction site of the hollow sections.

The present invention is schematically shown in the drawings as an example. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 5 is a front sectional view of the plug-in connector according to arrow V in FIG. 3;

FIG. 6 is an enlarged and cut-away detail of area VI from FIG. 3;

DESCRIPTION OF THE PREFERRED EMBODIMENTS

Figure 2:
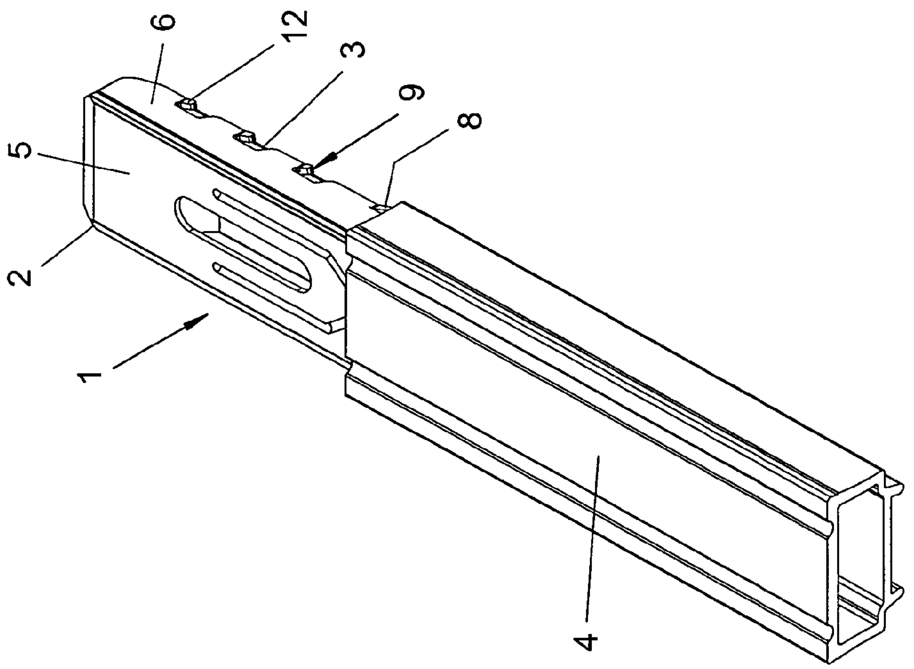
FIG. 2 is another perspective view showing the first variant of a multipart plug-in connector in connection with a hollow section.

Referring to the drawings in particular, The present invention pertains to a multipart plug-in connector (1) for hollow sections (4) of spacer frames for insulating glass panes. The plug-in connector (1) comprises at least two connector parts (2, 3), which can be plugged into one another, with an essentially U-shaped or box-shaped cross section, which mesh with one another. The present invention pertains, furthermore, to the design and mutual adaptation of the connector parts (2, 3).

Figure 7:
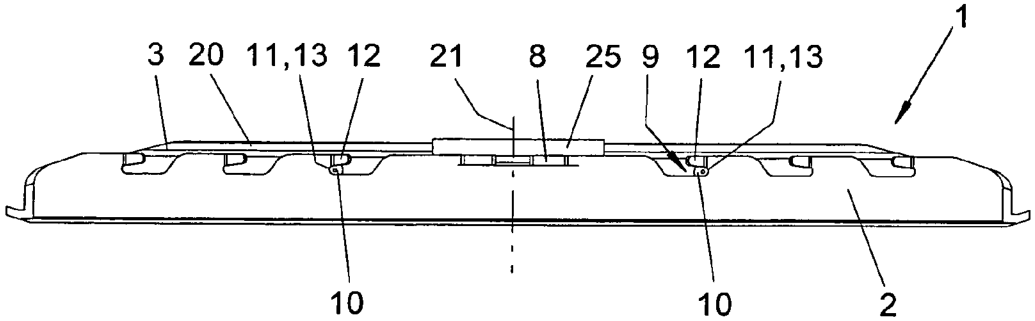
FIG. 7 is a side view showing a second variant of the multipart plug-in connector.
Figure 8:
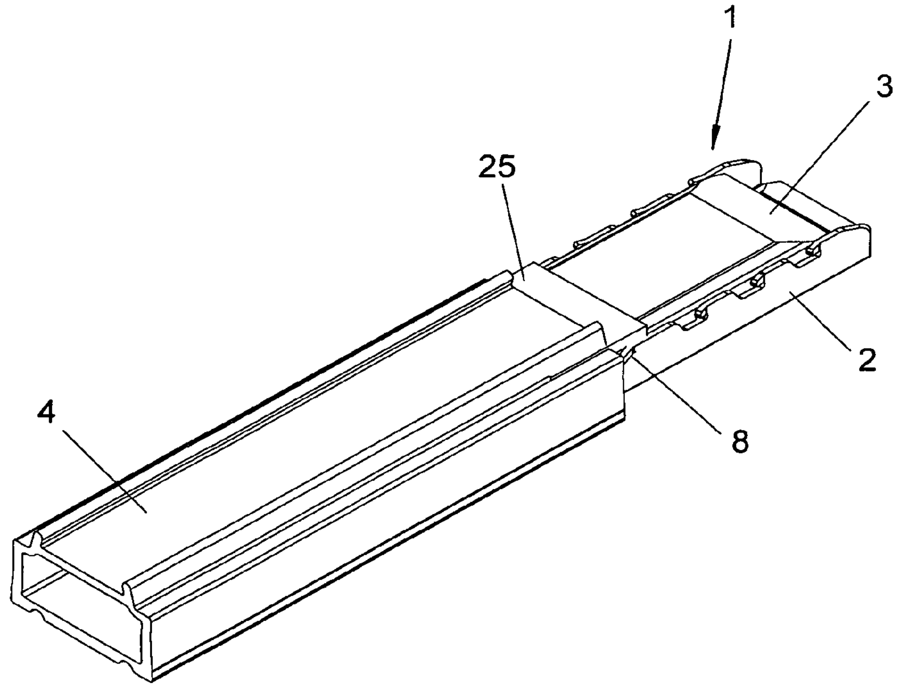
FIG. 8 is a perspective view of the plug-in connector from FIG. 7 with a hollow section.

FIGS. 1 through 6 show a first variant of the multipart plug-in connector (1). FIGS. 7 and 8 show a second variant, which is especially suitable for a gas-tight connection.

The outer connector part (2) has the U-shaped cross section mentioned and forms a shell of sufficient width for receiving the inner, narrower connector part (3) by plugging in. The outer connector part (2) has a transversely arranged middle wall (5) with two upwardly extending, preferably flat side walls or side webs (6), which adjoin said middle wall at the edge and which have a free edge (7). The inner connector part (3) is likewise essentially U-shaped or shell-shaped and has a middle wall (16) and two side walls or side webs (17) adjoining same on the side. The two connector parts (2, 3) are plugged into one another in the plugged-in position with openings facing each other at right angles to the longitudinal axis (22) of the connector and form a tubular shape with one another with a cavity (24) located inside. FIG. 5 shows a front view of this arrangement. The side walls (6, 17) are arranged at closely spaced locations from one another and may touch each other.

The plug-in connector (1) may have open or closed front sides (23) as desired. In case of open front sides (23), which are also open in both connector parts (2, 3), a desiccant present in the spacer frame can flow through the plug-in connector (1). As an alternative, the plug-in connector (1) may have an interior space for a granular material stop, which said interior space is closed at the front sides (23) and/or optionally in the inner area. The inner connector part (3) may have, as an alternative, a shape that is solid at least in some areas or a shape that is closed on the end side.

Figure 1:
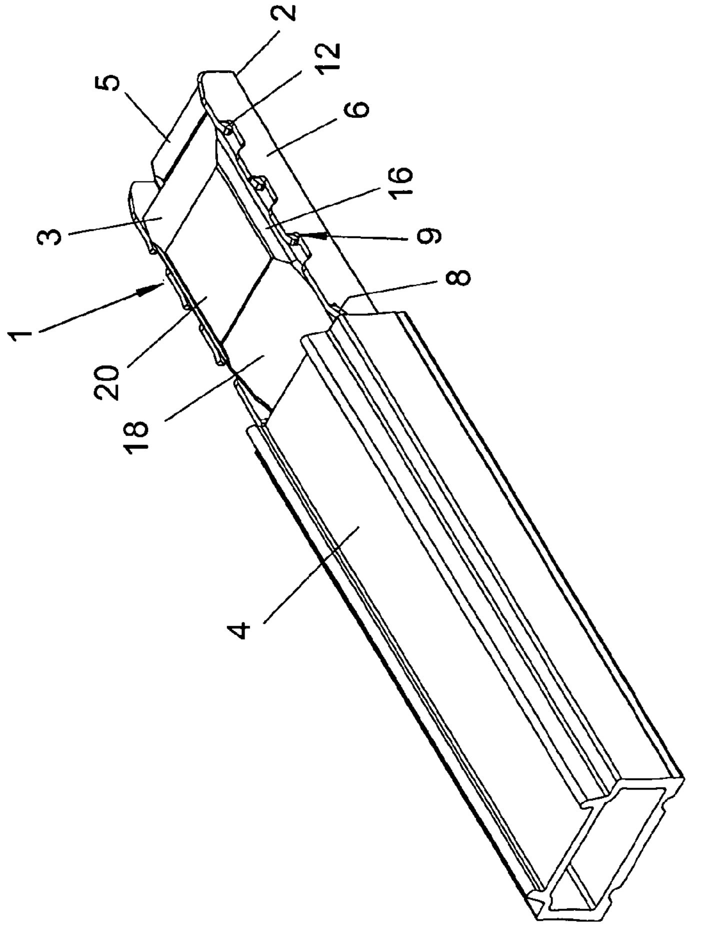
FIG. 1 is a perspective view showing a first variant of a multipart plug-in connector in connection with a hollow section.
Figure 3:
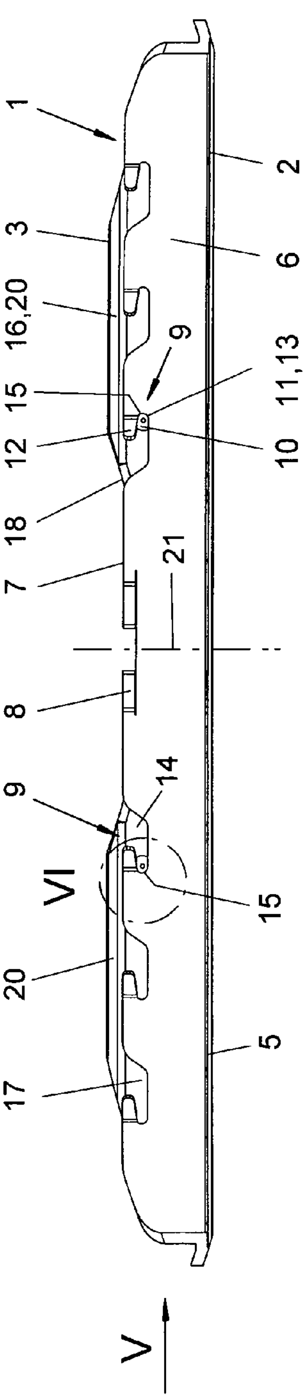
FIG. 3 is a in a side view showing the multipart plug-in connector from FIG. 1.

FIGS. 1 and 2 as well as FIG. 8 show the multipart plug-in connector (1) in connection with a hollow section (4) of a spacer frame. The middle wall (5) of the outer connector part (2) may point here towards the inner side of the frame and towards the inner side of the insulating glass pane. The middle wall (16) of the inner connector part (3) plugged in points towards the roof area of the hollow section (4) and towards the outer side of the frame in this case. As an alternative, the arrangement may also be reversed, in which case the inner connector part (3) points with its transversely located middle wall (16) towards the inner side of the frame.

The hollow sections (4) pushed over the plug-in connector (1) on the end side meet at the connection point (21). This may also be the transverse center line or central axis of the plug-in connector (1). The plug-in connector (1) also has at least one middle stop (8) in this middle area. The plug-in connector (1) and its connector parts (2, 3) are adapted to the inner contour of the hollow sections (4) and are guided in a positive-locking manner there. The height adaptation may be brought about especially by humps (20), which are arranged at spaced locations on both sides of the center line (21) and rise up, at the middle wall (16) of the inner connector part (3). The lateral adaptation is determined by the width of the outer connector part (2). The side walls (6) of the connector part (2) may be in contact, e.g., with the free edge (7) at an edge-side step of the hollow sections (4) (not shown) in a positive-locking manner and also compensate a height tolerance here by means of suitable spring bosses or the like. The shape of the connector parts may otherwise be similar to that in DE 20 2004 004 734 U1.

The plug-in connector (1) has a positive-locking connection (9) of its connector parts (2, 3), which is arranged and acts at the side walls (6, 17). To form the positive-locking connection (9), a connector part, preferably the inner connector part (3), has at least one upwardly projecting projection (10) at one or both side walls (17). The other connector part, preferably the outer connector part (2), has at least one receiving opening (11), which fits the projection (10) and with which the projection (10) meshes in the plugged-in position, at one or both side walls (6). A clip connection, which provides positive-locking guiding preferably in all directions, is embodied as a result. Four such connection points with a projection (10) and a receiving opening (11) are present in the embodiment being shown. The connection points are arranged at both side wall pairs (6, 17) and on both sides of the transversely extending center line (21) of the plug-in connector (1).

One connector part, preferably the outer connector part (2), may be designed as a standard connector and also used alone and in the one-part form as a plug-in connector for hollow sections (4) of spacer frames. This connector part may be designed especially similarly to the connector known from EP 0 283 689 A1. This connector part (2) can thus be used for several purposes and may be used, as desired, as an individual connector or as a part of a multipart plug-in connector (1).

At one side wall or both side walls (6), the connector part (2) has one or more retaining elements (12), which ensure secure seating in the hollow section (4) and prevent the plug-in connector (1) from being pulled out of the hollow section (4) in an undesired manner. The retaining elements (12) may have different shapes. In the shape being shown, these are spring-loaded retaining dogs, which may form a part of the side wall (6). They are cut out, e.g., of the side wall (6) and are directed or bent obliquely outwardly as well as optionally also obliquely upwardly. Four such retaining dogs form the middle stops (8) in the middle area of the center line (21).

At least one wall opening (13) each in the side wall (6), which acts as a receiving opening (11) for the projection (10) and for the positive-locking connection (9), is assigned to the retaining elements (12). It is arranged in the area of the retaining element (12) and is located, e.g., directly at the retaining element (12) or in close proximity thereto. The wall opening (13) may be a hole in the wall or a passage opening and determined by the manufacture and/or function of the retaining element (12). The wall opening (13) may be formed, e.g., by the cutting out or cut-out of the retaining element (12) and by bending said retaining element out of the side wall (6) and may be located directly behind the projecting retaining element (12). As an alternative, it may be present additionally and located next to, especially below the retaining element (12). The wall opening (13) has, opposite the direction of plugging in, in at least some areas, a fixed contour or edge, which forms a retention or resistance for the projection (10) and secures the holding together of the connector parts (2, 3).

In the embodiment being shown, the retaining dogs (12) are arranged at the free edge (7) of the side walls (6) and have an enlarged cut-out (14), which extends to below the spring boss (12). The cut-out (14) has a slot-like design and extends beyond the free front end of the retaining dog (12) in the direction of the center line (21). As is illustrated in the side view in FIG. 3, all retaining elements or retaining dogs (12)

are directed towards the center line (12), and the slot-like cut-outs (14) open towards the center line (21) and end at the free edge (7).

The cut-outs (14) are wall openings (13) in the side walls (6) and act as receiving openings (11) for the projections (10) to form the clip connection (9). The local position and shape of the projections (10) at the other connector part (3) are adapted to the position and design of the wall openings (13) or receiving opening (11) such that they mesh with these in a positive-locking manner when the connector parts (2, 3) are plugged into one another. The projections (10) are also located now in the area of the retaining elements (12) and their position is adapted to the arrangement thereof. In the embodiment being shown, the meshing point is located in the area of the cut-out (14) located below the retaining elements (12) and the wall opening (13) formed here.

The projections (10) have a shape suitable for the positive-locking connection. This may be, e.g., a conical or hemispherical shape, as it is shown as an example in FIG. 5 in the cross section and in the meshing position in the wall opening (13). The projections (14) are now in contact with the upper and lower edges of the wall opening (13) and, in addition, with the lateral edge area (15) of the wall opening (13), which said lateral edge area points away from the center line (21). As a result, the wall opening (13) surrounds the projection (10) on three sides and guides same in a positive-locking manner. Projection (10) has a correspondingly adapted position and shape for this purpose.

To form a positive-locking connection (9) along all three translatory axes, the projections (10) arranged on both sides of the center line (21) cooperate with the wall openings (13) and the lateral edge areas (15) thereof. The respective wall areas (15) located opposite each other prevent a relative motion of the connector parts (2, 3) in both directions along the longitudinal axis (22). The relative motion is prevented by the retaining dogs (12) in the upward direction. Guiding is ensured in the transverse direction by the mutual contact of the side walls (6, 17) and optionally also by a conical or wedge-shaped clamping of the projection (10) at the wall opening (13).

In the embodiment being shown, one or both connector parts (2, 3) may be made as metal parts and especially as stampings and bent components consisting of metal, especially steel sheet. The cut-outs (14) are favorable in respect to the stamping technique, on the one hand, and offer the mobility necessary for tolerance compensation for the retaining elements and retaining dogs (12) due to the release, on the other hand. Due to the springy property, the retaining dogs (12) can also escape at the positive-locking connection points when the connector parts (2, 3) are plugged into one another and let the projections (10) snap into the corresponding wall openings (13), which are located deeper. The connector parts (2, 3) can also be removed when necessary.

One or both connector parts (2, 3) may also consist of another material and be manufactured according to a different manufacturing technique. For example, they may consist entirely or partly of plastic or a composite. One connector part or both connector parts (2, 3) may consist, furthermore, of plastic, metal or another, suitable material as cast parts or injection molded parts.

In a modified embodiment, not shown, the wall openings (13) and their assignment to the retaining elements (12) may be different. The wall openings (13) may be designed, e.g., as a circumferentially defined cut-out of a laterally projecting retaining element (12) and located in a side wall area spaced apart from the free edge (7). Due to a lateral projection of the retaining element (12), the cut-out or wall opening (13) becomes free and offers space for the meshing of a projection (10). The projection (10) can come to lie as a result behind the projecting retaining element (12). The three-sided cut-out can be as large as the retaining element formed hereby in this case. As an alternative, the cut-out may extend beyond the front free end of the retaining element and create an additional opening area here, which forms said wall opening (13) and the receiving opening (11) for the projection (10). The edge area of the wall opening or receiving opening (11, 13) leading in the direction of the longitudinal axis (22) is directed towards the center line (21) in this case. There is a guiding and connection (9) that is positive-locking in all directions due to the connection points located opposite each other on both sides at the center line (21) in this case as well.

In the exemplary embodiments shown, there are four connection points, two each of which are arranged at each side wall pair (6, 17) and on both sides of the center line (21), for the positive-locking connection (9). The number of connection points may alternatively be lower or higher. In particular, it may be sufficient to provide two connection points, which are preferably arranged on both sides of the center line (21) at the same side wall (6) or diagonally opposite each other at different side walls (6, 17). A single connection point is also sufficient in the extreme case. A wall opening (13) or receiving opening (11) with a circumferential edge cooperating in a positive-locking manner in all directions is recommended in this case.

The multipart plug-in connector (1) shown in the exemplary embodiments can be adapted for a gas-tight connection of the hollow sections (4). One or both connector parts (2, 3), e.g., the inner connector part (3), may have for this purpose a depression (18) at the middle wall (16) in the area of the center line (21). This depression (18) offers space for a suitable sealant, which consists, e.g., of butyl. This depression (18) is empty in the initial state of the plug-in connector (1) in the first embodiment according to FIGS. 1 through 6. It is filled with a pasty or liquid sealant fed in from the outside only when the hollow sections (4) are pushed over. The sealant may be filled in shortly before the hollow sections (4) abut against each other through the narrow slot still existing at that time. As an alternative, the outer wall or roof wall of one or both hollow sections (4) may be drilled after forming the butt joint, and the sealant is filled in through the hole(s) arranged in the area of the depression.

Figure 4:
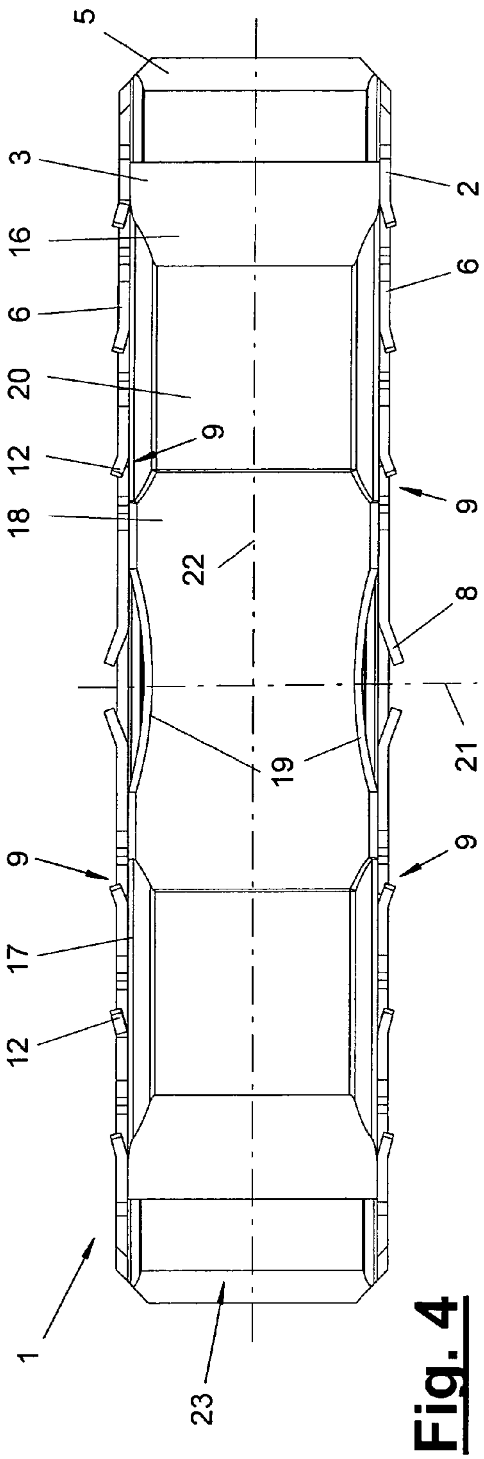
FIG. 4 is a in a top view showing the multipart plug-in connector from FIG. 1.

As is shown in the top view in FIG. 4, the inner connector part (3) may have, besides, an indentation (19) at its side walls (17) in the area of the center line (21). A lateral free space, into which liquid or pasty sealant can likewise penetrate, is created hereby in cooperation with the flat and straight side walls (6). As a result, the sealant surrounds the inner connector part (3) at the junction site (21) on three contiguous sides. Tightness is guaranteed downward by the shell shape of the outer connector part (2).

The side walls (6) of the outer connector part (2) may have an intrinsically flexurally stable side wall height in the area of the center line or junction site (21). This is favorable if the connector part (2) is to be used as a standard connector and as an individual plug. It will thus have sufficient flexural strength at the connection point. The depression of the side wall height shown in DE 20 2004 004 734 U1 is likewise possible as a variant.

FIGS. 7 and 8 show a variant of the multipart plug-in connector (1). A support (25) consisting of a sealing material, e.g., butyl, is arranged at the trough-shaped depression (18) in this case. The support (25) may form a compressible sealing pad. It may be, in particular, a compressible foam body. The shape of the support (25) is adapted to the depression and preferably fills same out exactly, so that lateral guiding is provided. The humps (20) adjoining the depression (18) on both sides may be longer in this case.

Various modifications of the embodiments shown and described are possible. In particular, the features of the different exemplary embodiments may be combined with one another as desired. In addition, individual design features, such as the depressions (18) or the lateral indentations, may be omitted. Furthermore, the number, design and arrangement of the retaining elements (12) and of the wall openings (13) may be varied as desired. Depending on the design of the plug, the retaining elements (12) and wall openings (13) may also be located at the inner connector part (3) and the projections (10) at the outer connector part (2). The type, design and arrangement of one or more middle stops (8) can also be selected as desired. They may also be, in particular, window stops.

While specific embodiments of the invention have been shown and described in detail to illustrate the application of the principles of the invention, it will be understood that the invention may be embodied otherwise without departing from such principles.

The invention claimed is:

1. A plug-in connector for hollow sections of spacer frames for insulating glass panes, the plug-in connector comprising:

a first connector part with U-shaped or box-shaped cross section; and a second connector part with U-shaped or box-shaped cross section to provide at least two connector parts that can be plugged into each other with adjacent side walls in the plugged-in position, wherein the connector parts have a positive-locking connection comprising at least one projection and a receiving opening at the side walls and one of said two connector parts has at least one retaining element with a corresponding wall opening at side walls thereof, said projection meshing with a wall opening in the plugged-in position.

2. A plug-in connector in accordance with claim 1, wherein a plurality of cooperating projections and wall openings are provided for a positive-locking connection acting in plural directions.

3. A plug-in connector in accordance with claim 1, wherein the wall opening comprises a cut-out and is arranged below the corresponding retaining element.

4. A plug-in connector in accordance with claim 2, wherein the cut-out comprises a slot opening towards a center line of the plug-in connector.

5. A plug-in connector in accordance with claim 1, wherein the retaining elements are arranged at a free edge of the side walls.

6. A plug-in connector in accordance with claim 1, wherein the wall opening comprises a circumferentially defined cut-out of a laterally projecting retaining element and is arranged in a side wall area spaced apart from the free edge.

7. A plug-in connector in accordance with claim 1, wherein the position and shape of the projection are adapted to an edge area of the wall opening, which said edge area points away from a center line of the plug-in connector.

8. A plug-in connector in accordance with claim 1, wherein the projection has a conical or hemispherical shape.

9. A plug-in connector in accordance with claim 1, wherein one said projection is arranged at both side walls of an inner connector part and on both sides of a center line of the plug-in connector.

10. A plug-in connector in accordance with claim 9, wherein the four projections are adapted to the wall openings located adjacent on both sides of a center line of the plug-in connector.

11. A plug-in connector in accordance with claim 1, wherein an outer of said connector parts has at least one middle stop.

12. A plug-in connector in accordance with claim 1, wherein an outer of said connector parts has an intrinsically flexurally stable side wall height in the area of the center line.

13. A plug-in connector in accordance with claim 1, wherein an inner of said connector parts has a depression in the area of the center line at its middle wall.

14. A plug-in connector in accordance with claim 13, wherein a support comprising a sealing material, is arranged in the depression.

15. A plug-in connector in accordance with claim 1, wherein an inner of said connector parts has humps at spaced locations on both sides of the center line.

16. A plug-in connector in accordance with claim 1, wherein an inner of said connector parts has an indentation at its side walls in the area of the center line.

17. A plug-in connector in accordance with claim 1, wherein the plug-in connector has open front sides.

18. A plug-in connector in accordance with claim 1, wherein the connector parts are designed as stampings and bent components consisting of sheet metal.

19. A plug-in connector in accordance with claim 1, wherein the connector parts are designed as injection molded or cast parts consisting of metal or plastic.

* * * * *